US012539915B2

(12) United States Patent
Habibnejad Korayem et al.

(10) Patent No.: US 12,539,915 B2
(45) Date of Patent: Feb. 3, 2026

(54) STEERING ROAD WHEEL PINION ANGLE ESTIMATION AND SENSORY VALIDATION

(71) Applicant: GM GLOBAL TECHNOLOGY OPERATIONS LLC, Detroit, MI (US)

(72) Inventors: Amin Habibnejad Korayem, Markham (CA); SeyedAlireza Kasaiezadeh Mahabadi, Novi, MI (US); Seyedeh Asal Nahidi, North York (CA); Ibrahim A. Badiru, Novi, MI (US); Hojjat Izadi, Richmond Hill (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 51 days.

(21) Appl. No.: 18/738,638

(22) Filed: Jun. 10, 2024

(65) Prior Publication Data
US 2025/0376213 A1    Dec. 11, 2025

(51) Int. Cl.
*B62D 15/02* (2006.01)
*B62D 3/12* (2006.01)
*B62D 5/04* (2006.01)

(52) U.S. Cl.
CPC .......... *B62D 15/0225* (2013.01); *B62D 3/12* (2013.01); *B62D 5/0481* (2013.01)

(58) Field of Classification Search
None
See application file for complete search history.

(56) References Cited

U.S. PATENT DOCUMENTS

| | | | | |
|---|---|---|---|---|
| 7,841,443 B2 * | 11/2010 | Mizuno | ................ | B62D 5/0463 180/443 |
| 8,245,813 B2 * | 8/2012 | Mizuno | .................. | B62D 3/123 180/444 |
| 8,977,437 B2 * | 3/2015 | Tamaizumi | .......... | B62D 5/0463 280/771 |
| 10,112,642 B2 * | 10/2018 | Ko | ........ | B62D 15/024 |
| 10,752,286 B2 * | 8/2020 | Ko | ........... | B62D 6/008 |
| 11,084,526 B2 * | 8/2021 | Yu | ........ | B62D 15/022 |

(Continued)

FOREIGN PATENT DOCUMENTS

| | | | | |
|---|---|---|---|---|
| CN | 104918841 A | * | 9/2015 | ........... B62D 5/0466 |
| CN | 104995077 A | * | 10/2015 | ............. B62D 6/008 |

(Continued)

OTHER PUBLICATIONS

German Office Action from counterpart DE102024122204, dated May 13, 2025.

*Primary Examiner* — Kevin R Steckbauer

(57) ABSTRACT

A vehicle system includes a road wheel system having a road wheel actuator and at least one pinion angle sensor, and a control module. The control module is configured to receive a road wheel actuator command and a rack force, generate a model of the road wheel system based on the road wheel actuator command and the rack force, estimate, with a state observer, a steering pinion angle based on the generated model, the road wheel actuator command and the rack force, determine a validity of a steering pinion angle measured by the at least one pinion angle sensor based on the estimated steering pinion angle and a threshold, and in response to determining that the measured steering pinion angle is invalid, control a steering function of the vehicle based on the estimated steering pinion angle.

20 Claims, 7 Drawing Sheets

(56) References Cited

U.S. PATENT DOCUMENTS

| | | | | |
|---|---|---|---|---|
| 11,919,580 | B2 * | 3/2024 | Yang | B62D 15/027 |
| 12,054,204 | B2 * | 8/2024 | Ramanujam | B62D 5/0481 |
| 12,091,106 | B2 * | 9/2024 | Nichols | B62D 15/0225 |
| 12,097,917 | B2 * | 9/2024 | Miyake | B62D 6/10 |
| 12,157,527 | B2 * | 12/2024 | Matsuo | B62D 15/021 |
| 12,252,196 | B2 * | 3/2025 | Hong | B62D 6/10 |
| 12,344,307 | B2 * | 7/2025 | Badiru | B62D 6/002 |
| 2008/0042389 | A1 * | 2/2008 | Mizuno | B62D 5/0463 |
| | | | | 280/93.514 |
| 2011/0040448 | A1 * | 2/2011 | Mizuno | B62D 3/123 |
| | | | | 701/41 |
| 2014/0081524 | A1 * | 3/2014 | Tamaizumi | B62D 7/159 |
| | | | | 701/42 |
| 2017/0096161 | A1 * | 4/2017 | Ko | B62D 15/024 |
| 2017/0183031 | A1 * | 6/2017 | Ko | B62D 6/008 |
| 2019/0092383 | A1 * | 3/2019 | Kodera | B62D 6/002 |
| 2019/0359252 | A1 * | 11/2019 | Yu | G06F 17/142 |
| 2020/0269912 | A1 * | 8/2020 | Lapis | B62D 6/006 |
| 2021/0354750 | A1 * | 11/2021 | Kim | B62D 5/006 |
| 2021/0403085 | A1 * | 12/2021 | Hong | B62D 6/10 |
| 2022/0081030 | A1 * | 3/2022 | Miyake | B62D 6/008 |
| 2022/0289270 | A1 * | 9/2022 | Nichols | B62D 15/0235 |
| 2023/0182807 | A1 * | 6/2023 | Yang | B62D 15/027 |
| | | | | 701/41 |
| 2024/0367711 | A1 * | 11/2024 | Nichols | B62D 15/0225 |
| 2024/0383532 | A1 * | 11/2024 | Badiru | B62D 6/002 |
| 2025/0242859 | A1 * | 7/2025 | Chae | B62D 5/0481 |

FOREIGN PATENT DOCUMENTS

| | | | | | |
|---|---|---|---|---|---|
| CN | 104995077 | B | * | 3/2017 | B62D 5/0463 |
| CN | 107021133 | A | * | 8/2017 | B62D 6/008 |
| CN | 107531276 | B | * | 12/2018 | B60W 30/12 |
| CN | 107021133 | B | * | 4/2019 | B62D 6/008 |
| CN | 106926895 | B | * | 6/2019 | B62D 5/0472 |
| CN | 110304135 | A | * | 10/2019 | B62D 6/00 |
| CN | 110901761 | A | * | 3/2020 | G01L 5/221 |
| CN | 111278715 | A | * | 6/2020 | B62D 15/025 |
| CN | 110525511 | B | * | 8/2021 | B62D 5/0481 |
| CN | 114248834 | A | * | 3/2022 | B62D 6/00 |
| CN | 118323259 | A | * | 7/2024 | B62D 5/0463 |
| CN | 113928408 | B | * | 7/2025 | B62D 5/0463 |
| DE | 102004009822 | A1 * | 9/2005 | B60T 8/885 |
| DE | 102004009823 | A1 * | 9/2005 | B62D 5/008 |
| DE | 102016012242 | A1 * | 4/2017 | B62D 6/008 |
| DE | 102016014562 | A1 * | 6/2017 | B62D 5/0472 |
| DE | 102021206743 | A1 * | 12/2021 | B62D 6/00 |
| DE | 102016012242 | B4 * | 8/2022 | B62D 6/008 |
| DE | 102022132864 | A1 * | 6/2023 | B62D 5/0466 |
| DE | 102021206743 | B4 * | 2/2024 | B62D 5/0472 |
| DE | 102024112908 | B3 * | 3/2025 | B62D 6/008 |
| EP | 1642806 | A2 * | 4/2006 | B62D 15/0245 |
| JP | 2008265687 | A | * | 11/2008 | |
| JP | 2019059392 | A | * | 4/2019 | B62D 5/0463 |
| JP | 2023003575 | A | * | 1/2023 | B62D 6/008 |
| JP | 7642456 | B2 | * | 3/2025 | B62D 6/008 |
| KR | 101694763 | B1 * | 1/2017 | B62D 5/0424 |
| KR | 101694764 | B1 * | 1/2017 | B62D 6/00 |
| KR | 20170069064 | A | * | 6/2017 | B62D 5/0463 |
| KR | 20170078405 | A | * | 7/2017 | B62D 5/0475 |
| KR | 20170082718 | A | * | 7/2017 | B62D 6/10 |
| KR | 20210051430 | A | * | 5/2021 | B62D 5/0463 |
| KR | 102322485 | B1 * | 11/2021 | B62D 5/0472 |
| KR | 102322500 | B1 * | 11/2021 | B62D 6/008 |
| KR | 20220001205 | A | * | 1/2022 | B62D 15/00 |
| KR | 102453327 | B1 * | 10/2022 | B60D 1/187 |
| KR | 102494676 | B1 * | 2/2023 | B60D 1/187 |
| KR | 102718294 | B1 * | 10/2024 | B62D 5/0481 |
| WO | WO-2022270164 | A1 * | 12/2022 | B62D 6/008 |

* cited by examiner

STEERING ROAD WHEEL PINION ANGLE ESTIMATION AND SENSORY VALIDATION

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicle systems and methods for steering road wheel pinion angle estimation and sensory validation.

A vehicle includes a steering system for controlling a driving direction of the vehicle. A driver may rotate a steering wheel an angular amount to change the direction of the vehicle. The rotational movement of the steering wheel is transferred to a vehicle tie rod or a road wheel actuator. For example, the rotational movement of the steering wheel may be transferred via a mechanical connection between the steering wheel and the tie rod and/or via an electrical connection (e.g., a signal) to the road wheel actuator having a rack and a pinion. With respect to the road wheel actuator, the pinion is actuated based on the rotational movement of the steering wheel to cause translation of the rack and movement of the vehicle wheels. In some steering systems, one or more steering pinion angle sensors may be employed as part of a road wheel actuator mechanism in a steer-by-wire system.

SUMMARY

A vehicle system for estimating a steering pinion angle for a road wheel system of a vehicle, includes a road wheel system having a road wheel actuator having a rack and a pinion configured to cause the rack to move and at least one pinion angle sensor, and a control module in communication with the one pinion angle sensor. The control module is configured to receive a road wheel actuator command and a rack force, generate a model of the road wheel system based on the road wheel actuator command and the rack force, estimate, with a state observer, a steering pinion angle based on the generated model, the road wheel actuator command and the rack force, determine a validity of a steering pinion angle measured by the at least one pinion angle sensor based on the estimated steering pinion angle and a threshold, and in response to determining that the measured steering pinion angle is invalid, control a steering function of the vehicle based on the estimated steering pinion angle.

In other features, the control module is configured to compare a difference between the estimated steering pinion angle and the measured steering pinion angle to the threshold and determine the measured steering pinion angle is invalid in response to the difference between the estimated steering pinion angle and the measured steering pinion angle being greater than or equal to the threshold.

In other features, the threshold is a variable threshold based on one or more vehicle parameters.

In other features, the one or more vehicle parameters include a vehicle speed.

In other features, the control module is configured to receive a motor position signal associated with the road wheel actuator and estimate the rack force based on the received motor position signal.

In other features, the control module is configured to control the steering function of the vehicle based on the measured steering pinion angle in response to determining that the measured steering pinion angle is valid.

In other features, the at least one pinion angle sensor is a first pinion angle sensor, the road wheel system includes a second pinion angle sensor, and the control module is configured to determine a validity of a steering pinion angle measured by the second pinion angle sensor based on the estimated steering pinion angle and the threshold, and in response to determining that the measured steering pinion angle from the first pinion angle sensor and the measured steering pinion angle from the second pinion angle sensor are invalid, control the steering function of the vehicle based on the estimated steering pinion angle.

In other features, the control module is configured to estimate a steering pinion angle rate based on the generated model, determine a validity of an actual steering pinion angle rate based on the estimated steering pinion angle rate and a threshold, and in response to determining that the measured steering pinion angle and the measured steering pinion angle rate are invalid, control the steering function of the vehicle based on the estimated steering pinion angle.

In other features, the state observer includes a Kalman filter.

In other features, a vehicle includes the vehicle system.

A method for estimating a steering pinion angle for a road wheel system of a vehicle is disclosed. The road wheel system includes a road wheel actuator having a rack and a pinion configured to cause the rack to move and at least one pinion angle sensor. The method includes receiving a road wheel actuator command, a rack force, and a measured steering pinion angle, generating a model of the road wheel system based on the road wheel actuator command and the rack force, estimating, with a state observer, a steering pinion angle based on the generated model, the road wheel actuator command and the rack force, determining a validity of the measured steering pinion angle based on the estimated steering pinion angle and a threshold, and in response to determining that the measured steering pinion angle is invalid, controlling a steering function of the vehicle based on the estimated steering pinion angle.

In other features, determining the validity of the measured steering pinion angle includes comparing a difference between the estimated steering pinion angle and the measured steering pinion angle to the threshold and determining the measured steering pinion angle is invalid in response to the difference between the estimated steering pinion angle and the measured steering pinion angle being greater than or equal to the threshold.

In other features, the threshold is a variable threshold based on one or more vehicle parameters.

In other features, the one or more vehicle parameters include a vehicle speed.

In other features, the at least one pinion angle sensor is a first pinion angle sensor, the road wheel system includes a second pinion angle sensor, and the method further includes determining a validity of a steering pinion angle measured by the second pinion angle sensor based on the estimated steering pinion angle and the threshold.

In other features, determining the validity of the measured steering pinion angle of the second pinion angle sensor includes comparing a difference between the estimated steering pinion angle and the measured steering pinion angle of the second pinion angle sensor to the threshold, and determining the measured steering pinion angle is invalid in response to the difference between the estimated steering pinion angle and the measured steering pinion angle of the second pinion angle sensor being greater than or equal to the threshold.

In other features, controlling the steering function of the vehicle based on the estimated steering pinion angle includes controlling the steering function of the vehicle based on the estimated steering pinion angle in response to determining that the measured steering pinion angle from the first pinion angle sensor and the measured steering pinion angle from the second pinion angle sensor are invalid.

In other features, the method further includes estimating a steering pinion angle rate based on the generated model and determining a validity of an actual steering pinion angle rate based on the estimated steering pinion angle rate and a threshold.

In other features, controlling the steering function of the vehicle based on the estimated steering pinion angle includes controlling the steering function of the vehicle based on the estimated steering pinion angle in response to determining that the measured steering pinion angle and the measured steering pinion angle rate are invalid.

In other features, the method further includes receiving a motor position signal associated with the road wheel actuator and estimating the rack force based on the received motor position signal.

A non-transitory computer-readable medium storing instructions that, when executed by a control module, cause the control module to generate a model of a road wheel system in a vehicle based on a road wheel actuator command and a rack force, the road wheel system including a road wheel actuator having a rack and a pinion, estimate, with a state observer, a steering pinion angle based on the generated model, the road wheel actuator command and the rack force, determine a validity of a measured steering pinion angle from a pinion angle sensor in a vehicle based on the estimated steering pinion angle and a threshold, and in response to determining that the sensed steering pinion angle is invalid, control a steering function of the vehicle based on the estimated steering pinion angle.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
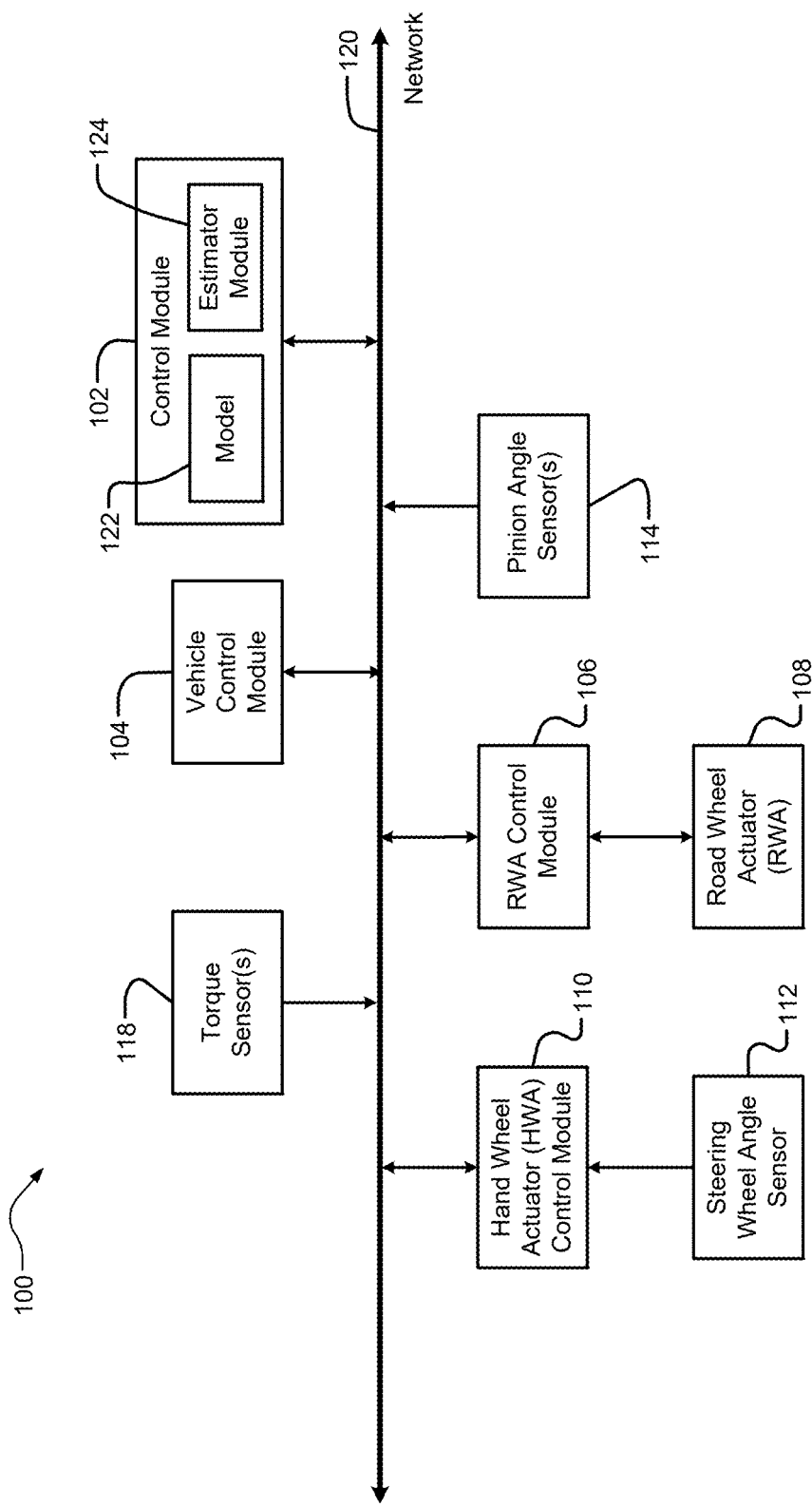
FIG. 1 is a block diagram of an example vehicle system for estimating a steering pinion angle of a vehicle and validating actual measurements of one or more pinion angle sensors, according to the present disclosure.

A vehicle may rely on a steer-by-wire system for controlling vehicle driving directions. In such examples, the steer-by-wire system or mechanism is a safety-critical system that necessitates ample redundancy and backup for both actuation and sensing. As one example, pinion angle measurements from one or more steering pinion angle sensors, that can be translated to steering rack positions through a C-factor (e.g., a gear ratio), often play a vital role in honoring driver requested steering commands and influencing other vehicle motion control systems. However, the pinion angle sensors are often prone to failure and/or degradation under certain conditions. As such, because the sensors are part of the safety-critical system, it is necessary to have a strategy in place to compensate for any sensor failures or degradation.

The vehicle systems and methods according to the present disclosure provide solutions for estimating a steering pinion angle of a vehicle based on sources of information independent of characteristic associated with one or more steering pinion angle sensors in the vehicle, and then validating actual measurements of the one or more steering pinion angle sensors based on the estimated angle. For example, and as further explained below, the vehicle systems and methods generate a model of a road wheel system (e.g., a road wheel actuator) based on a road wheel actuator command and a rack force, estimate, with a state observer, a steering pinion angle based in part on the generated model, and determine a validity of a steering pinion angle measured by at least one pinion angle sensor based on the estimated steering pinion angle and a threshold. Then, based on the validity of the measured steering pinion angle, the vehicle systems and methods generate can control a steering function of the vehicle based on the estimated steering pinion angle or the measured steering pinion angle.

With this mitigation strategy, faulty or degraded pinion angle sensors may be identified and compensated for by replacing the measured steering pinion angle with the estimated steering pinion angle to ensure accurate and safe vehicle control. Additionally, through the steering pinion angle estimation based on independent characteristics and actual steering pinion angle validation, the mitigation strategy is easily adaptable to accommodate unique configurations and sensing systems of various different vehicle programs. Further, the vehicle systems and methods herein ensure that the reconstruction methodology thereof remains valid under any operating range, even if the expectations for a sensor backup are generally lower in terms of signal response time and robustness compared to the original direct measurement. This ensures that the system remains effective and reliable, regardless of the operating conditions. As such, a significant improvement in vehicle systems (e.g., steer-by-wire systems) may be realized by providing a reliable and adaptable solution for compensating for all steering pinion angle sensors (e.g., primary and secondary pinion angle sensors) failure or validation in case of no redundancy (primary or secondary sensor failure).

Referring now to FIG. 1, a block diagram of an example vehicle system 100 is presented for estimating or otherwise determining a steering pinion angle of a vehicle and validating actual measurements of one or more pinion angle sensors based on the estimated angle. As shown in FIG. 1, the vehicle system 100 generally includes a control module 102, a vehicle control module 104, a road wheel actuator (RWA) control module 106, a RWA 108, a hand wheel actuator (HWA) control module 110, and various sensors for detecting or sensing vehicle parameters. In the example of FIG. 1, the sensors may include a hand wheel angle sensor 112, one or more pinion angle sensors 114, and one or more torque sensors 118. In various embodiments, the vehicle system 100 may include at least two pinion angle sensors 114, such as a primary sensor and a secondary (or redundant) sensor.

Although FIG. 1 illustrates the vehicle system 100 as including specific modules, it should be appreciated that one or more other modules may be employed if desired. Additionally, while the vehicle system 100 is shown as including multiple separate modules, any combination of the modules (e.g., the control module 102, the vehicle control module 104, RWA control module 106, the HWA control module 110, etc.) and/or the functionality thereof may be integrated into one or more modules. Further, although the vehicle system 100 of FIG. 1 is shown as including particular sensors, it should be appreciated that the system 100 and/or other systems may include more or less sensors, sensors having different functionalities, etc.

In various embodiments, the modules and sensors of the vehicle system 100 may be in communication with each other and may share parameters via a network 120, such as a controller area network (CAN). In such examples, the parameters may be shared via one or more data buses of the network 120. As such, various parameters may be made available by a given module and/or sensor to other modules and/or sensors via the network 120.

Figure 2:
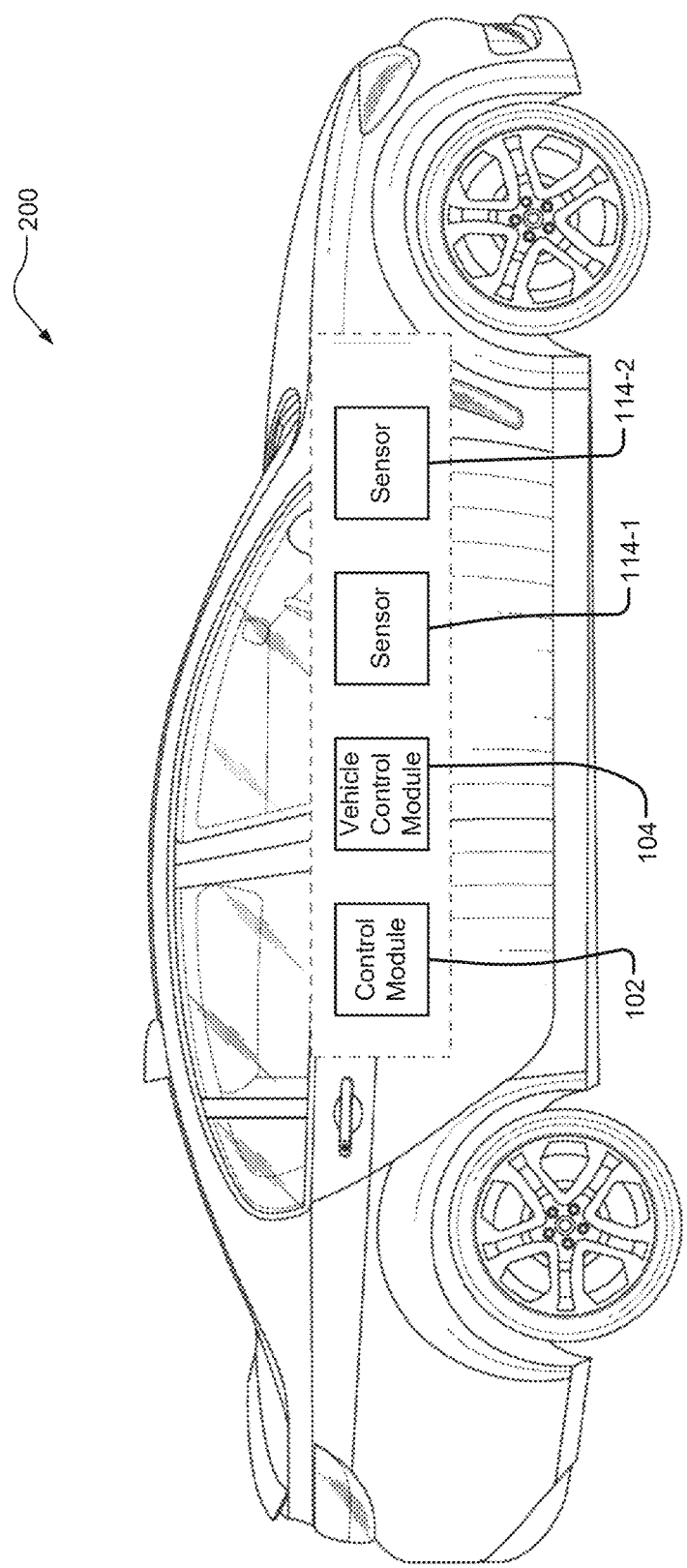
FIG. 2 is a vehicle including portions of the vehicle system of FIG. 1, according to the present disclosure.

The vehicle system 100 of FIG. 1 may be employable in any suitable vehicle, such as an electric vehicle (e.g., a pure electric vehicle, a plug-in hybrid electric vehicle, etc.), an internal combustion engine vehicle, etc. Additionally, the vehicle system 100 may be applicable to an autonomous vehicle, a semi-autonomous vehicle, etc. For example, FIG. 2 depicts a vehicle 200 including the control module 102 and the vehicle control module 104, and two pinion angle sensors 114-1, 114-2 in communication with the control module 102 and/or the vehicle control module 104. In such examples, one of the pinion angle sensors 114-1 of FIG. 2 may be a primary sensor and the other one of the pinion angle sensors 114-2 of FIG. 2 may be a secondary (or redundant) sensor.

With continued reference to FIG. 1, the interaction between a driver and the vehicle (e.g., the vehicle 200 of FIG. 2) takes place through steering and pedal inputs. For example, in a steer-by-wire (SbW) control system, a driver steering command is translated to a torque value for an electric motor in a road wheel system to rotate a steering pinion, move or translate a steering rack, and generate a desired vehicle road wheel angle command (e.g., a road wheel actuator command). For instance, the HWA control module 110 may generate the driver steering command based on a received input from the hand wheel angle sensor 112 (e.g., a steering wheel angle sensor). In such examples, the hand wheel angle sensor 112 generally monitors the rotational position, movement, etc. of the vehicle's steering wheel to generate a steering wheel angle. In various embodiments, the driver steering command to the desired vehicle road wheel angle command transition is part of a closed loop control loop achievable through the measuring of a pinion angle (e.g., via the pinion angle sensor(s) 114) and using C-factor to calculate a steering rack position for a certain steering hand wheel angle command from the driver.

In the example of FIG. 1, the road wheel system of the vehicle system 100 may include various components. For example, the road wheel system may include the RWA control module 106, the RWA 108, the pinion angle sensor(s) 114, the HWA control module 110, etc. In such examples, the RWA 108 may have a steering rack and a pinion (not shown in FIG. 1) for causing the rack to move. For example, the rack often includes a bar having teeth along (at least a portion of) its length. When controlled based on the road wheel actuator command, the pinion (e.g., a gear) can rotate along the teeth to move the rack, thereby causing vehicle wheels (e.g., front vehicle wheels or rear vehicle wheels) coupled to the rack to move. In such examples, the pinion angle sensor(s) 114 generally detect or measure a rotational angle of the pinion (e.g., the gear), which represents an angular displacement of the electric motor in the road wheel system. In various examples, the rotational angle of the pinion may correspond to a turning angle of the vehicle wheels. The pinion angle sensor(s) 114 may then output the measured angle to the control module 102 and/or another suitable module of the vehicle system 100 of FIG. 1, such as the vehicle control module 104 for vehicle motion control systems, the HWA control module 110, etc.

Figure 3:
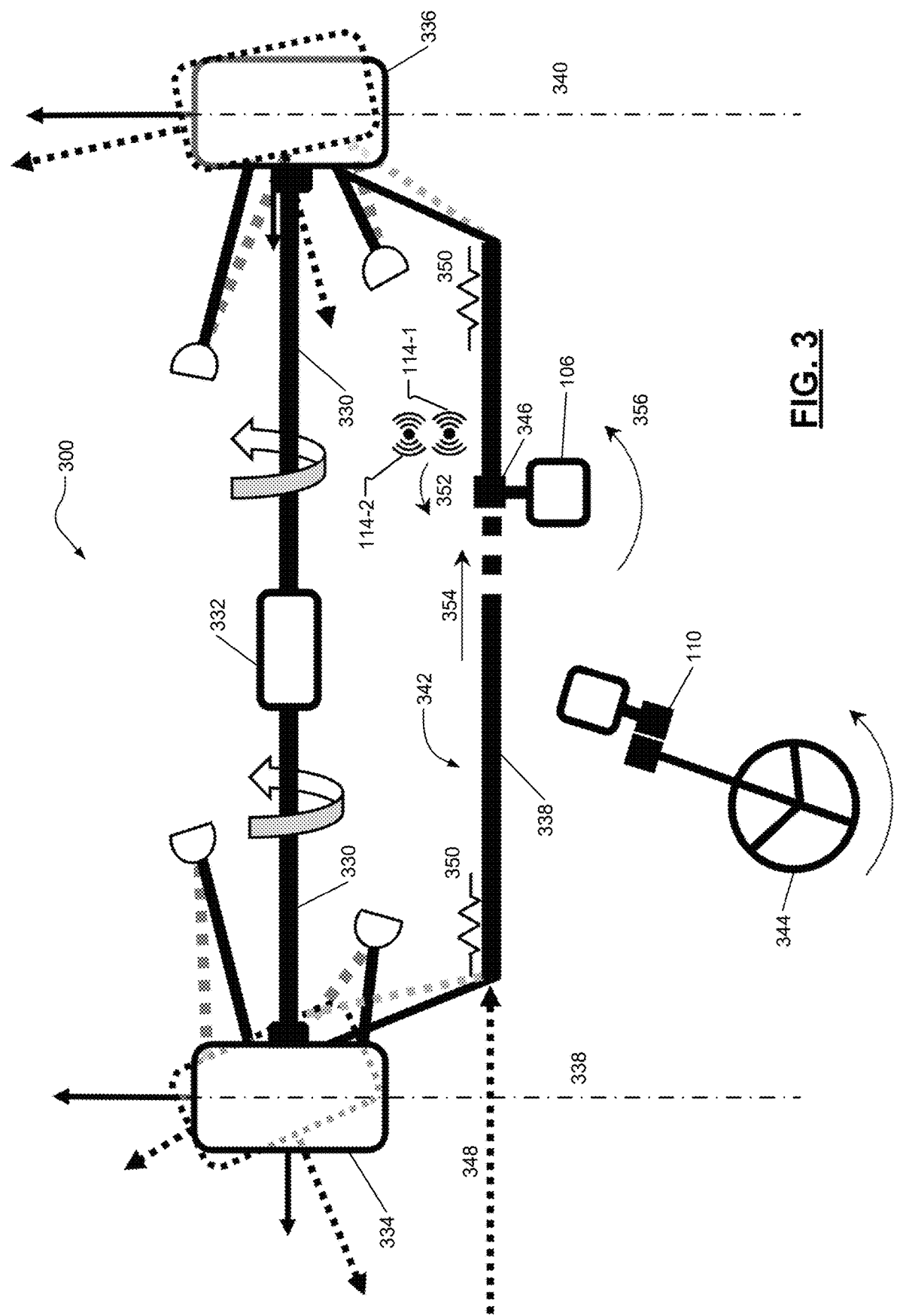
FIG. 3 is a block diagram of an example steering system of a vehicle, according to the present disclosure.

In various embodiments, the control module 102 generally estimates a steering pinion angle associated with a steering system of the vehicle and then validates actual angle measurements of the more pinion angle sensor(s) 114 based on the estimated angle. As one example, FIG. 3 depicts a steering system 300 of a vehicle, such as the vehicle 200 of FIG. 2. As shown in FIG. 3, the steering system 300 generally includes an axel 330, a differential 332, wheels 334, 336 (having respective center lines 338, 340), a tie rod 342 with a portion thereof constituting a rack, a steering wheel 344, a pinion 346, the RWA control module 106 of FIG. 1, the HWA control module 110 of FIG. 1, and the pinion angle sensors 114-1, 114-2 of FIGS. 1-2.

With continued reference to FIG. 1, the control module 102 may rely on different input signals to estimate the steering pinion angle of the vehicle, the control module 102 may rely on different input signals, such as the road wheel actuator command and a tie rod force. For example, in the example of FIG. 1, the control module 102 may receive a road wheel actuator command and a rack force (Fr). In such examples, the road wheel actuator command is a voltage signal generated by the RWA control module 106 for a road wheel actuator motor (e.g., the electric motor in the road wheel system). Additionally, the rack force (Fr) or a tie rod load is indicative of a force on a tie rod, as indicated by a dashed line 348 of FIG. 3.

In various embodiments, the received rack force (Fr) may be estimated. For example, the rack force can be estimated based on steering system signals (e.g., a steering motor torque, a motor position, and motor velocity) and vehicle signals (e.g., a vehicle yaw rate and a vehicle speed). For instance, the control module 102 may receive a motor position signal associated with the RWA 108, and then estimate the rack force based on the received motor position signal. In such examples, the rack force estimation may be only a function of a motor position sensor (providing the motor position signal). As such, the rack force estimation is an independent source of information in case of pinion angle sensor failure.

Then, the control module 102 generates at least one model of the road wheel system based on the road wheel actuator command and the rack force. This generated model is shown in FIG. 1 as model 122. For example, the control module 102 may develop a two degrees of freedom (DOF) state-space model to capture the dynamic motion of the electric motor in the road wheel system and pinion (e.g., the pinion 346 of FIG. 3). Additionally, in some examples, the control module 102 may develop a single DOF state-space model to capture discrepancies between delivered and requested torque for the electric motor. In such examples, the pinion angle can be converted to rack displacement/movement through C-factor as explained above.

In the example of FIG. 1, the generated model may be a mathematical representation of the road wheel system through inputs, outputs, state variables and differential equations. For example, the model may be utilized to support a relationship between different sensory/non-sensory information and physical system parameters associated with the vehicle. In such examples, the generated model may provide multiple evolved states (e.g., a steering pinion angle, a steering pinion angle rate, and a delivered motor current), and multiple evolved outputs (e.g., a steering rack position and a delivered torque for the electric motor).

As one example, the two DOF state-space model for the road wheel system may be represented by the following set of Equations (1)-(15). In this example, $J_m$ represents a motor inertia, $\theta_m$ represents a motor angular displacement (e.g., a rotational angle of the pinion), $K_C$ represents a motor stiffness, $B_m$ represents a motor damping, $K_r$ represents an electric motor stiffness, $B_r$ represents an electric motor damping, $M_r$ represents a rack weight, $x_r$ represents a rack position, $r_p$ represents a pinion radius, N represents a motor gear ratio, $T_{RWA}$ represents a RWA motor torque, $I_m$ represents a RWA motor current, $V_{mRWA}$ represents a RWA motor voltage, $L_m$ represents a lumped motor inertia, $R_m$ represents a lumped motor stiffness, and $K_{emf}$ represents a steering motor emf. With reference to the steering system 300 of FIG. 3, the motor stiffness $K_C$ is generally indicated by resistance symbols 350, the motor angular displacement $\theta_m$ is generally represented by line 352, the rack position $x_r$ is generally represented by line 354, and the RWA motor torque $T_{RWA}$ is generally represented by line 356.

$$J_m \ddot{\theta}_m = K_C \theta_m + B_m \dot{\theta}_m + K_r \theta_m + B_r \dot{\theta}_m \quad \text{Equation (1)}$$

$$M_r \ddot{x}_r = K_r x_r + B_r \dot{x}_r \quad \text{Equation (2)}$$

$$x_r = \frac{r_p}{N} \times \theta_m \quad \text{Equation (3)}$$

$$T_{RWA}^{req} = \tau_{RWA} \times \dot{T}_{RWA} + T_{RWA} \quad \text{Equation (4)}$$

$$T_{RWA} = N \times K_t \times I_m \quad \text{Equation (5)}$$

$$V_{mRWA} = L_m \dot{I}_m + R_m I_m + K_{emf} \dot{\theta}_m \quad \text{Equation (6)}$$

$$\frac{1}{N}(T_{RWA} - (r_p \times F_r)) = \left(\frac{K_r \times r_p^2}{N^2} + \frac{K_c}{N^2}\right) \times \theta_m + \left(B_m + \frac{B_r + r_p^2}{N^2}\right) \times \dot{\theta}_m + \left(J_m + \frac{M_r \times r_p^2}{N^2}\right) \times \ddot{\theta}_m + F_{fric} \times \sin(\theta_m) \quad \text{Equation (7)}$$

$$\dot{X}_{RWA} = A_{RWA} X_{RWA} + B_{RWA} u_{RWA} \quad \text{Equation (8)}$$

$$Y_{RWA} = C_{RWA} X_{RWA} \quad \text{Equation (9)}$$

$$X_{RWA} = \begin{Bmatrix} \theta_m \\ \dot{\theta}_m \\ I_m \end{Bmatrix} \quad \text{Equation (10)}$$

$$u_{RWA} = \begin{Bmatrix} V_{mRWA} \\ F_r \end{Bmatrix} \quad \text{Equation (11)}$$

$$Y_{RWA} = \begin{Bmatrix} x_r \\ T_{RWA} \end{Bmatrix} \quad \text{Equation (12)}$$

$$A_{RWA} = \begin{bmatrix} 0 & 1 & 0 \\ -\frac{K_{eq}}{J_{eq}} & -\frac{B_{eq}}{J_{eq}} & \frac{K_t}{J_{eq}} \\ 0 & -\frac{K_{emf}}{L_m} & -\frac{R_m}{L_m} \end{bmatrix} \quad \text{Equation (13)}$$

$$B_{RWA} = \begin{bmatrix} 0 & 0 \\ 0 & \frac{-r_p}{N \times J_{eq}} \\ \frac{1}{L_m} & 0 \end{bmatrix} \quad \text{Equation (14)}$$

$$C_{RWA} = \begin{bmatrix} \frac{r_p}{N} & 0 & 0 \\ 0 & 0 & N \times K_t \end{bmatrix} \quad \text{Equation (15)}$$

Then, the control module 102 relies on a state observer to estimate a steering pinion angle. For example, and as shown in FIG. 1, the control module 102 includes an estimator module 124 implementing a real-time state observer to estimate the steering pinion angle based on the generated model 122, the road wheel actuator command, the rack force, noise, and delivered torque for the electric motor (e.g., measured by the one of the torque sensors 118 of FIG. 1). For example, the state observer may be designed to estimate the steering pinion angle based on the generated space-state model above, various parameters, and inputs (e.g., the road wheel actuator command, the rack force, and input noise). As one example, the state observer may be a Kalman filter to perform this estimation using the state space model Equations (8)-(12) above and the state space model Equations (16)-(18) below. In this example, W and V represent a process noise and a sensor noise, respectively.

$$\dot{X}_{RWA} = A_{RWA} X_{RWA} + B_{RWA} u_{RWA} + W \quad \text{Equation (16)}$$

$$Y_m = C_{Obs} X_{RWA} + V \quad \text{Equation (17)}$$

$$A_{Obs} = A_{RWA}, B_{Oba} = B_{RWA}, C_{Oba} = [\,0 \;\; 0 \;\; N \times K_t\,] \quad \text{Equation (18)}$$

The control module 102 may then determine whether the steering pinion angle measured by the pinion angle sensor(s) 114 is valid. For example, in the example of FIG. 1, the control module 102 determines the validity of the measured steering pinion angle based on the estimated steering pinion angle and a threshold. For instance, to determine the validity of the measurement, the control module 102 may determine a difference between the estimated steering pinion angle and the measured steering pinion angle, and then compare that difference to the threshold. In such examples, the control module 102 may determine that the measured steering pinion angle is invalid in response to the difference between the estimated steering pinion angle and the measured steering pinion angle being greater than or equal to the threshold. Additionally, the control module 102 may determine that the measured steering pinion angle is valid in response to the difference between the estimated steering pinion angle and the measured steering pinion angle being less than the threshold.

In various embodiments, the threshold used in the validity determination of the measured steering pinion angle may be any suitable value. For example, the threshold may be a fixed or variable threshold established for angle comparisons, indicating whether the output of the sensor(s) 114 deviates from the estimated steering pinion angle. In some examples, the threshold may be based on one or more vehicle parameters. In such examples, the threshold may be calculated based on vehicle speed, a time duration above pre-defined calibration angle value, and an error magnitude above pre-defined calibration angle value. In various embodiments, a calibration table including values for different vehicle speeds, time durations, and error magnitudes may be utilized to set the threshold for the pinion angle validation, which then can be adjusted according to the actual vehicle speed, duration, and magnitude of the estimated angle error.

In some examples, the vehicle system 100 may include multiple pinion angle sensors 114, such as a primary sensor and a secondary sensor, as explained above. In such examples, the control module 102 may determine the validity of a steering pinion angle measured by each pinion angle sensor 114 based on the estimated steering pinion angle and the threshold. More specifically, the control module 102 may compare the difference between the estimated steering pinion angle and each measured steering pinion angle from the multiple pinion angle sensors 114 and the threshold.

Additionally, the control module 102 may determine the validity of the pinion angle sensor(s) 114 based on the directional evolution of the pinion angle. In such examples, the directional evolution may be indicated by a steering pinion angle rate (e.g., an angular velocity). For instance, the control module 102 may estimate (e.g., with the state observer) a steering pinion angle rate based in part on the generated model. Then, the control module 102 may determine the validity of an actual steering pinion angle rate based on the estimated steering pinion angle rate and a threshold. As one example, to determine the validity of the actual steering pinion angle rate, the control module 102 may determine a difference between the estimated steering pinion angle rate and the actual steering pinion angle rate, and then compare that difference to the threshold. In such examples, the control module 102 may determine that the measured steering pinion angle rate is invalid in response to the difference being greater than or equal to the threshold or valid in response to the difference being less than the threshold.

Then, the control module 102 may initiate different actions based on whether the steering pinion angle measured by the pinion angle sensor(s) 114 is determined to be invalid (or valid). For example, in response to determining that the measured steering pinion angle is invalid, the control module 102 may control a steering function of the vehicle based on the estimated steering pinion angle (instead of the actual steering pinion angle from the pinion angle sensor(s) 114). In such examples, the control module 102 may transmit a signal with the estimated steering pinion angle (as a replacement for the actual steering pinion angle) to the vehicle control module 104 (e.g., a control module for a vehicle motion control system in the vehicle). In turn, the vehicle control module 104 can control a steering function of the vehicle based on the estimated steering pinion angle. In some examples, the In other examples, the control module 102 may control the steering function of the vehicle based on the measured (or actual) steering pinion angle from the pinion angle sensor(s) 114 in response to determining that the measured steering pinion angle is valid. In such examples, the control module 102 may transmit a signal with the actual steering pinion angle to the vehicle control module 104, which then can control a steering function of the vehicle based on the measured steering pinion angle.

In some examples, the control module 102 may only control the steering function of the vehicle based on the estimated steering pinion angle if both the measured steering pinion angle from the sensor(s) 114 is invalid and the actual steering pinion angle rate is invalid. In such examples, the control module 102 may transmit a signal with the estimated steering pinion angle to the vehicle control module 104 in response to determining that each measured steering pinion angle (e.g., a measured steering pinion angle from one sensor 114 or a measured steering pinion angle from multiple different sensors 114) is invalid and the actual steering pinion angle rate is invalid.

Additionally, in various embodiments, if multiple pinion angle sensors 114 are employed, the control module 102 may only control the steering function of the vehicle based on the estimated steering pinion angle if the measured steering pinion angle from each sensor 114 is invalid. In other words, the control module 102 may transmit a signal with the estimated steering pinion angle to the vehicle control module 104 in response to the determining that the measured steering pinion angle from the primary pinion angle sensor and the measured steering pinion angle from the secondary pinion angle sensor are invalid.

In such examples, the control module 102 may implement a predetermined strategy to address an inadequacy of the primary pinion angle sensor and/or the secondary pinion angle sensor. For example, in the event of a primary pinion angle sensor malfunctions (e.g., as indicated by an invalid steering pinion angle from that pinion angle sensor), the secondary pinion angle sensor may be activated to enable steering control. However, if the secondary pinion angle sensor also fails and cannot be validated, it may result in a dangerous situation, such as a constant overestimation of driver input. In such cases, a set of recommended corrective measures can be considered (e.g., remedial action 1 based on the estimated steering pinion angle, remedial action 2 based on the estimated steering pinion angle, remedial action 3 based on the estimated steering pinion angle, etc.). In various embodiments, for safety and robustness purposes, a latching strategy may be utilized based on degraded state status to retain the fault signal active even if the calculated error becomes less than the pre-defined threshold momentarily. This may substantially eliminate false negatives.

FIGS. 4-7 illustrate example control processes 400, 500, 600, 700 employable by the vehicle system 100 of FIG. 1 for estimating or otherwise determining a steering pinion angle of a vehicle (e.g., the vehicle 200 of FIG. 2, etc.), and validating actual measurements of one or more pinion angle sensors. Although the example control processes 400, 500, 600, 700 are described in relation to the vehicle system 100 of FIG. 1 including the control module 102, any one of the control processes 400, 500, 600, 700 may be employable by another suitable system.

Figure 4:
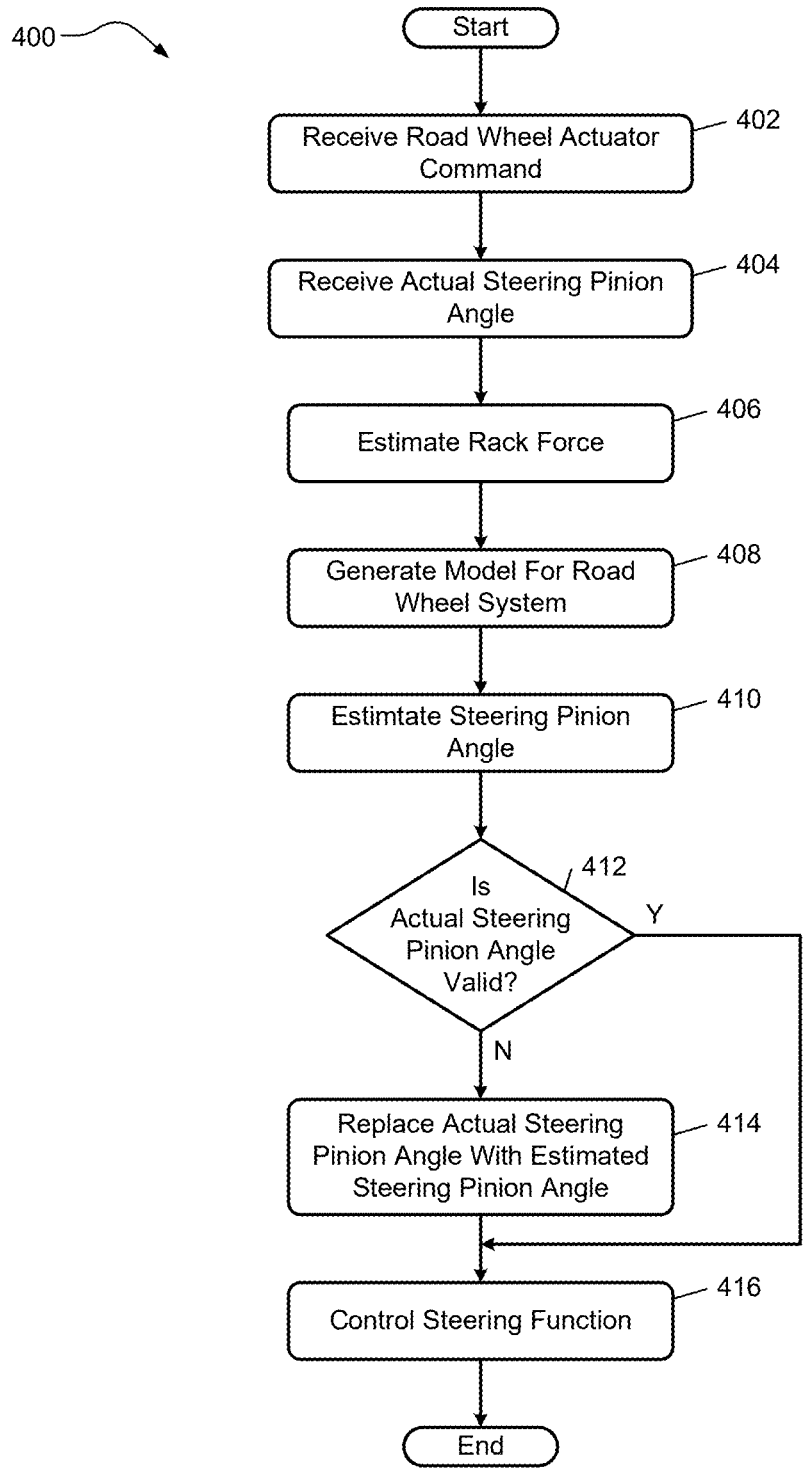
FIGS. 4-7 are flowcharts of example control processes for estimating a steering pinion angle of a vehicle and validating actual measurements of one or more pinion angle sensors, according to the present disclosure.

As shown in FIG. 4, the control process 400 begins by receiving various parameters. Specifically, the control process 400 begins at 402, 404, where the control module 102 receives a road wheel actuator command (in 402) and an actual measured steering pinion angle from the pinion angle sensor(s) 114 (in 404), as explained above. The control process 400 then proceeds to 406.

At 406, the control module 102 receives a rack force by estimating the rack force. For example, and as explained above, the control module 102 may estimate the rack force based on steering system signals, such as a received motor position signal associated with the RWA 108. The control process 400 then proceeds to 408.

At 408, the control module 102 generates a model of the road wheel system based on the road wheel actuator command and the estimated rack force. For example, and as explained above, the control module 102 may generate a state-space model to capture the dynamic motion of the electric motor in the road wheel system and pinion (e.g., the pinion 346 of FIG. 3). In various embodiments, the generated model may be represented by Equations (1)-(15) above. The control process 400 then proceeds to 410.

At 410, the control module 102 estimates a steering pinion angle based on the generated model. For instance, the control module 102 may implement a real-time state observer (e.g., in the form of a Kalman filter) to estimate the steering pinion angle. In various embodiments, the control module 102 may use the state space model Equations (8)-(12) and (16)-(18) referenced above to estimate the steering pinion angle. The control process 400 then proceeds to 412.

At 412, the control module 102 determines whether the actual measured steering pinion angle from the pinion angle sensor(s) 114 is valid. For example, and as explained above, the control module 102 may compare a difference between the estimated steering pinion angle and the measured steering pinion angle to a threshold, to determine the validity of the measured steering pinion angle (and more generally, the pinion angle sensor(s) 114). If the control module 102 determines that the measured steering pinion angle is valid at 412, the control process 400 proceeds to 416. Otherwise, if the control module 102 determines that the measured steering pinion angle is invalid at 412, the control process 400 proceeds to 414 where the control module 102 replaces (e.g., in memory, etc.) the actual measured steering pinion angle with the estimated steering pinion angle. The control process 400 then proceeds to 416.

At 416, the control module 102 controls a steering function of the vehicle based on the estimated steering pinion angle or the measured steering pinion angle from the pinion angle sensor(s) 114, as explained above. For example, if the measured steering pinion angle is determined to be valid, the control module 102 controls the steering function based on the measured steering pinion angle. If, however, the measured steering pinion angle is determined to be invalid, the control module 102 controls the steering function based on the estimated steering pinion angle. Control may then end as shown in FIG. 4 or return to another suitable step for continued estimation of the steering pinion angle and validation of actual pinion angle sensor measurements.

Figure 5:
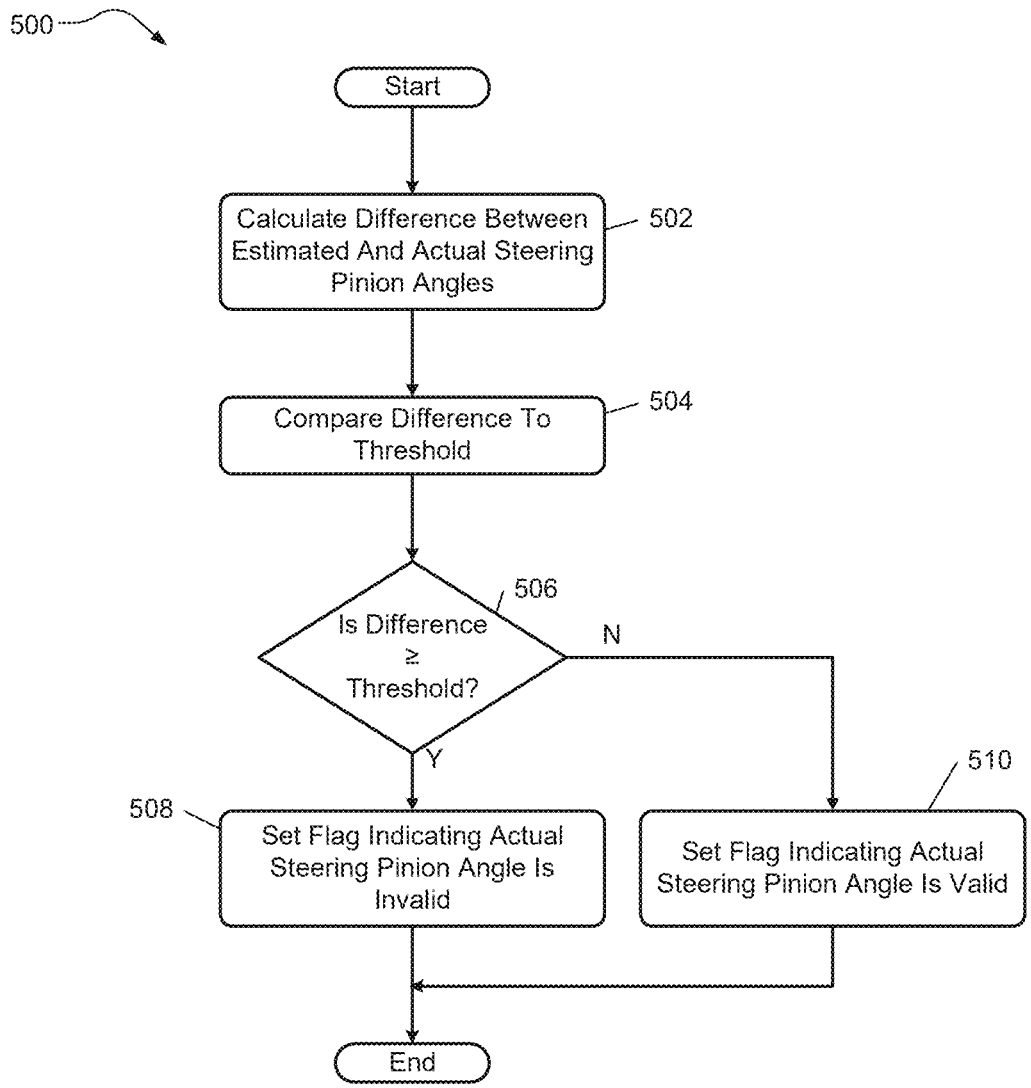

In FIG. 5, the control process 500 provides one example of determining whether an actual measured steering pinion angle from the pinion angle sensor(s) 114 is valid as referenced above in 412 of the control process 400 of FIG. 4. Specifically, and as shown in FIG. 5, the control process 500 begins by calculating a difference between an estimated steering pinion angle (e.g., as estimated according to 412 of the control process 400 of FIG. 4) and a measured steering pinion angle (e.g., as received according to 404 of the control process 400 of FIG. 4). In such examples, the control module 102 may substrate the estimated steering pinion angle from the measured steering pinion angle (or vice versa) and then set the absolute value of that calculation as the difference between the estimated and measured angles. The control process 500 then proceeds to 504.

At 504, the control module 102 compares the calculated difference between the estimated and measured angles to a threshold. In such examples, the threshold may be a fixed or variable threshold and based on calculated based on vehicle speed, a time duration above pre-defined calibration angle value, and an error magnitude above pre-defined calibration angle value, as explained above. The control process 500 then proceeds to 506.

At 506, the control module 102 determines whether the calculated difference between the estimated and measured angles is greater than or equal to the threshold. If yes at 506, the control process 500 proceeds to 508 where the control module 102 sets a flag indicating the actual measured steering pinion angle is invalid. However, if no at 506, the control process 500 proceeds to 510 where the control module 102 sets a flag indicating the actual measured steering pinion angle is valid. In either case, the control module 102 may then store the set flag for later control use, replace the actual measured steering pinion angle with the estimated steering pinion angle for control purposes in response to the invalid flag being set, maintain the actual measured steering pinion angle for control purposes in response to the valid flag being set, etc. Control may then end as shown in FIG. 5.

Figure 6:
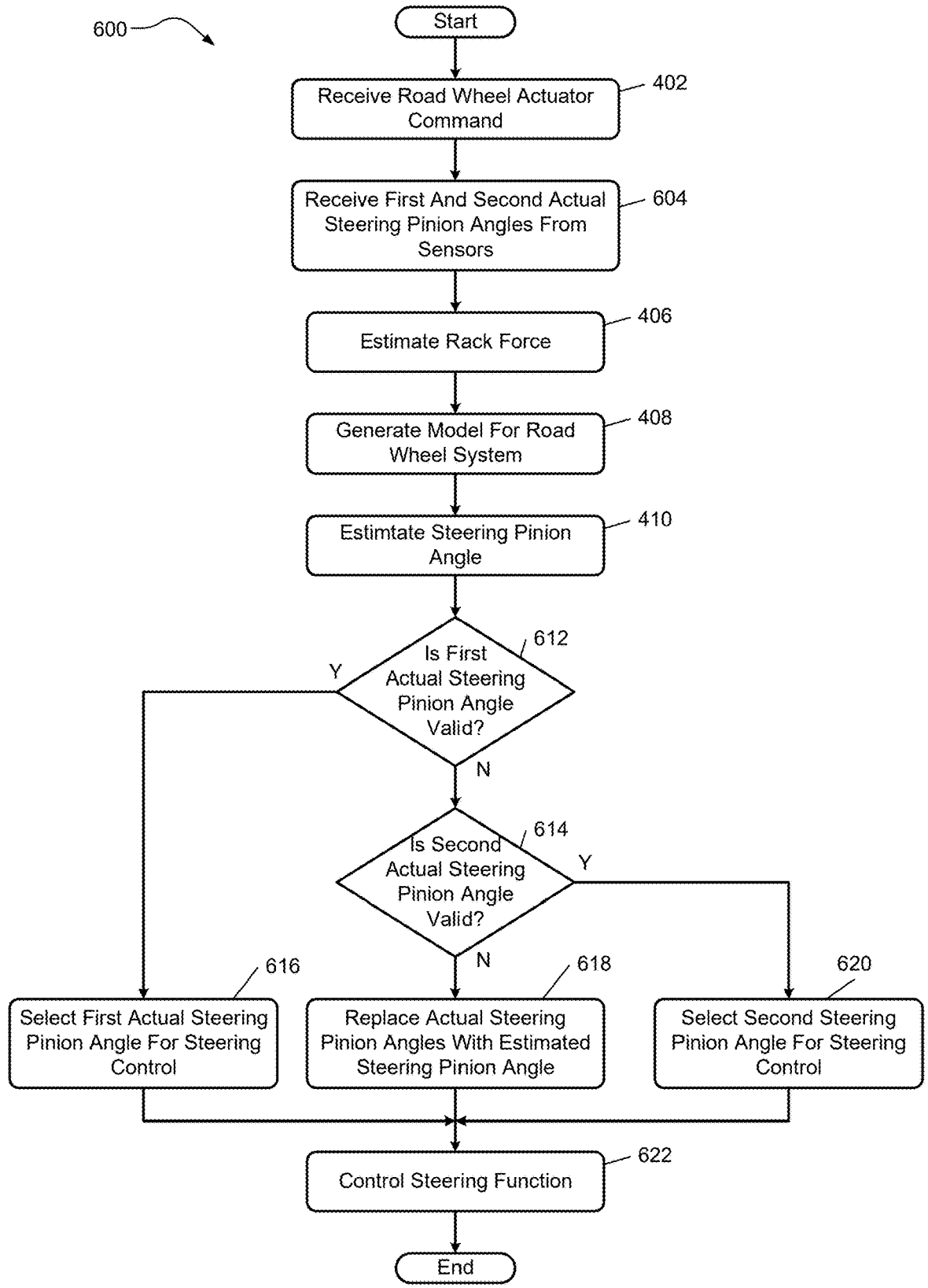

In FIG. 6, the control process 600 is similar to the control process 400 of FIG. 4 but includes additional steps. For example, and as shown in FIG. 6, the control process 600 begins at 402 of FIG. 4 as explained above, and then proceeds to 604. At 604, the control module 102 receives first and second actual measured steering pinion angles from two pinion angle sensors, such as the primary pinion angle sensor 114-1 and the secondary (or redundant) pinion angle sensor 114-2 of FIG. 2. The control process 600 then proceeds to 406, 408, 410, 612, of which 406, 408, 410 are explained above relative to FIG. 4.

At 612, the control module 102 determines whether the first measured steering pinion angle from the primary pinion angle sensor 114-1 is valid. For example, to determine the validity of the first measured steering pinion angle, the control module 102 may compare a difference between the estimated steering pinion angle and the first measured steering pinion angle to a threshold, as explained above. If the control module 102 determines that the first measured steering pinion angle is invalid at 612, the control process 600 proceeds to 614. Otherwise, if the control module 102 determines that the first measured steering pinion angle is valid at 612, the control process 600 proceeds to 616 where the control module 102 may select (or otherwise set) the first measured steering pinion angle for steering control. In various embodiments, the control module 102 may set a flag to indicate the selection of the first measured steering pinion angle for steering control. The control process 600 then proceeds to 622.

At 614, after determining that the first measured steering pinion angle from the primary pinion angle sensor 114-1 is invalid, the control module 102 determines whether the second measured steering pinion angle from the secondary (or redundant) pinion angle sensor 114-2 is valid. For example, the control module 102 may make this determination by comparing a difference between the estimated steering pinion angle and the second measured steering pinion angle to the threshold, as explained above. If the control module 102 determines that the second measured steering pinion angle is invalid at 614, the control process 600 proceeds to 618. Otherwise, if the control module 102 determines that the second measured steering pinion angle is valid at 614, the control process 600 proceeds to 620 where the control module 102 may select (or otherwise set) the second measured steering pinion angle for steering control. In some examples, the control module 102 may set a flag to indicate the selection of the second measured steering pinion angle for steering control. The control process 600 then proceeds to 622.

At 618, the control module 102 replaces the actual measured steering pinion angles with the estimated steering pinion angle. For example, the control module 102 may set a flag to indicate the selection of the estimated steering pinion angle for steering control, replace the actual measured steering pinion angles in memory with the estimated steering pinion angle, etc. The control process 400 then proceeds to 622, where the control module 102 controls a steering function of the vehicle based on the estimated steering pinion angle or one of the measured steering pinion angles from the pinion angle sensor(s) 114, as explained above. Control may then end as shown in FIG. 6 or return to another suitable step for continued estimation of the steering pinion angle and validation of actual pinion angle sensor measurements.

Figure 7:
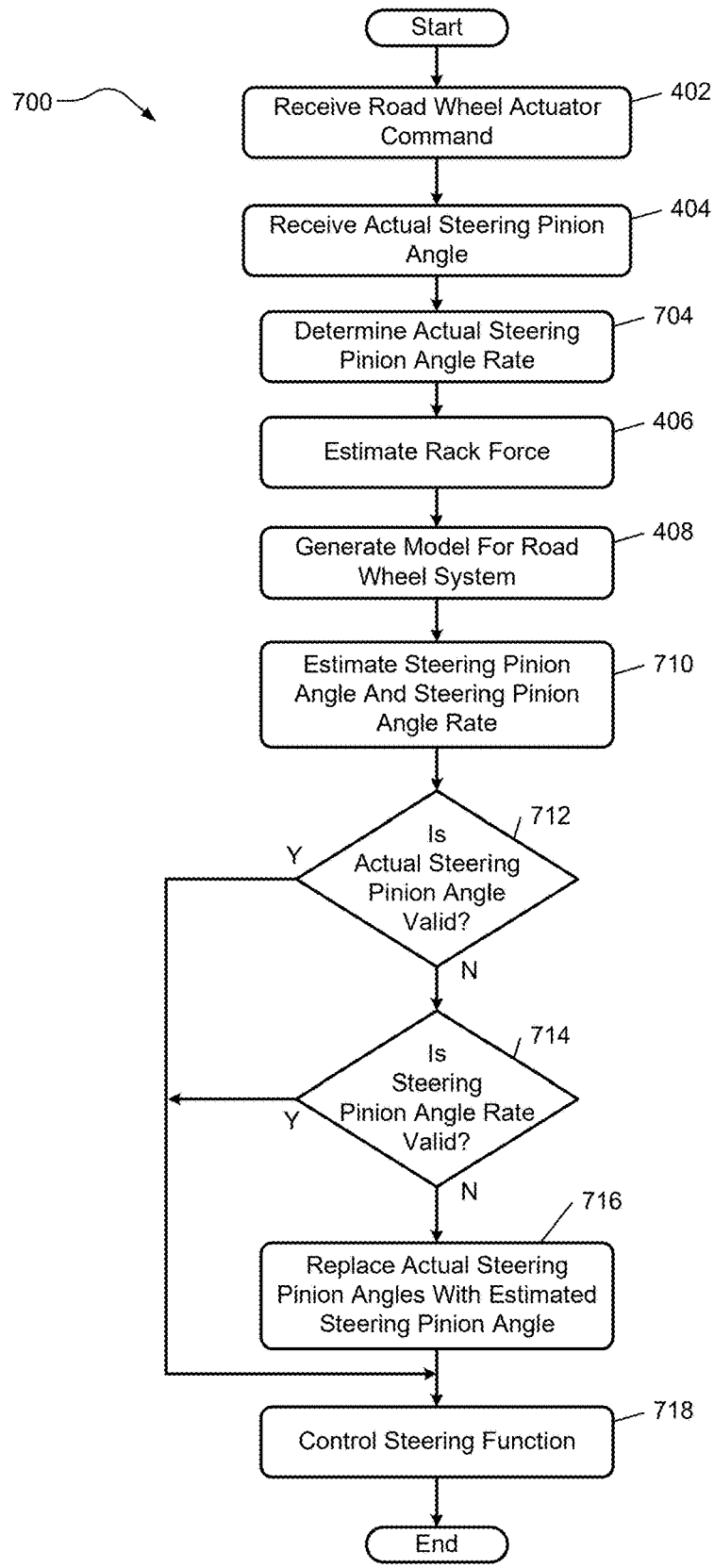

In FIG. 7, the control process 700 is similar to the control process 400 of FIG. 4 but includes additional steps. For example, and as shown in FIG. 7, the control process 700 begins at 402, 404 of FIG. 4 as explained above, and then proceeds to 704. At 704, the control module 102 determines an actual steering pinion angle rate. For example, the control module 102 may determine the actual steering pinion angle rate (e.g., a pinion angular velocity) based on the measured steering pinion angle and a unit of time (e.g., degrees per unit time). The control process 700 then proceeds to 406, 408, 710, of which 406, 408 are explained above relative to FIG. 4.

At 710, the control module 102 estimates a steering pinion angle and a steering pinion angle rate based on the generated model. For instance, the control module 102 may implement a real-time state observer (e.g., in the form of a Kalman filter) to estimate the steering pinion angle and associated steering pinion angle rate. In various embodiments, the control module 102 may use the state space model Equations (8)-(12) and (16)-(18) referenced above for such estimations. The control process 700 then proceeds to 712.

At 712, the control module 102 determines whether the actual measured steering pinion angle is valid. For example, to determine the validity of the measured steering pinion angle, the control module 102 may compare a difference between the estimated steering pinion angle and the measured steering pinion angle to a threshold, as explained above. If the control module 102 determines that the measured steering pinion angle is valid at 712, the control process 700 proceeds to 718. Otherwise, if the measured steering pinion angle is determined to be invalid at 712, the control process 700 proceeds to 714.

At 714, the control module 102 determines whether the actual steering pinion angle rate is valid. For example, to determine the validity of the actual steering pinion angle rate, the control module 102 may determine a difference between the estimated steering pinion angle rate and the actual steering pinion angle rate, and then compare that difference to a threshold, as explained above. If the control module 102 determines that the actual steering pinion angle rate is valid at 714, the control process 700 proceeds to 718. Otherwise, if the actual steering pinion angle rate is determined to be invalid at 714, the control process 700 proceeds to 716.

At 716, if both the actual steering pinion angle and steering pinion angle rate are invalid, the control module 102 replaces the actual measured steering pinion angle with the estimated steering pinion angle. For example, and as explained above, the control module 102 may set a flag to indicate the selection of the estimated steering pinion angle for steering control, replace the actual measured steering pinion angle in memory with the estimated steering pinion angle, etc. The control process 700 then proceeds to 718, where the control module 102 controls a steering function of the vehicle based on the estimated steering pinion angle or the measured steering pinion angle, as explained above. Control may then end as shown in FIG. 7 or return to another suitable step for continued estimation of the steering pinion angle and validation of actual pinion angle sensor measurements.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A vehicle system for estimating a steering pinion angle for a road wheel system of a vehicle, the vehicle system comprising:
    a road wheel system including a road wheel actuator having a rack and a pinion configured to cause the rack to move and at least one pinion angle sensor; and
    a control module in communication with the one pinion angle sensor, the control module configured to:
        receive a road wheel actuator command and a rack force;
        generate a model of the road wheel system based on the road wheel actuator command and the rack force;
        estimate, with a state observer, a steering pinion angle based on the generated model, the road wheel actuator command and the rack force;
        determine a validity of a steering pinion angle measured by the at least one pinion angle sensor based on the estimated steering pinion angle and a threshold; and
        in response to determining that the measured steering pinion angle is invalid, control a steering function of the vehicle based on the estimated steering pinion angle.

2. The vehicle system of claim 1, wherein the control module is configured to:
    compare a difference between the estimated steering pinion angle and the measured steering pinion angle to the threshold; and
    determine the measured steering pinion angle is invalid in response to the difference between the estimated steering pinion angle and the measured steering pinion angle being greater than or equal to the threshold.

3. The vehicle system of claim 2, wherein the threshold is a variable threshold based on one or more vehicle parameters.

4. The vehicle system of claim 3, wherein the one or more vehicle parameters include a vehicle speed.

5. The vehicle system of claim 1, wherein the control module is configured to:
    receive a motor position signal associated with the road wheel actuator; and
    estimate the rack force based on the received motor position signal.

6. The vehicle system of claim 1, wherein the control module is configured to control the steering function of the vehicle based on the measured steering pinion angle in response to determining that the measured steering pinion angle is valid.

7. The vehicle system of claim 1, wherein:
    the at least one pinion angle sensor is a first pinion angle sensor;
    the road wheel system includes a second pinion angle sensor; and
    the control module is configured to determine a validity of a steering pinion angle measured by the second pinion angle sensor based on the estimated steering pinion angle and the threshold, and in response to determining that the measured steering pinion angle from the first pinion angle sensor and the measured steering pinion angle from the second pinion angle sensor are invalid, control the steering function of the vehicle based on the estimated steering pinion angle.

8. The vehicle system of claim 1, wherein the control module configured to:
  estimate a steering pinion angle rate based on the generated model;
  determine a validity of an actual steering pinion angle rate based on the estimated steering pinion angle rate and a threshold; and
  in response to determining that the measured steering pinion angle and the measured steering pinion angle rate are invalid, control the steering function of the vehicle based on the estimated steering pinion angle.

9. The vehicle system of claim 1, wherein the state observer includes a Kalman filter.

10. A vehicle comprising the vehicle system of claim 1.

11. A method for estimating a steering pinion angle for a road wheel system of a vehicle, the road wheel system including a road wheel actuator having a rack and a pinion configured to cause the rack to move and at least one pinion angle sensor, the method comprising:
  receiving a road wheel actuator command, a rack force, and a measured steering pinion angle;
  generating a model of the road wheel system based on the road wheel actuator command and the rack force;
  estimating, with a state observer, a steering pinion angle based on the generated model, the road wheel actuator command and the rack force;
  determining a validity of the measured steering pinion angle based on the estimated steering pinion angle and a threshold; and
  in response to determining that the measured steering pinion angle is invalid, controlling a steering function of the vehicle based on the estimated steering pinion angle.

12. The method of claim 11, wherein determining the validity of the measured steering pinion angle includes:
  comparing a difference between the estimated steering pinion angle and the measured steering pinion angle to the threshold; and
  determining the measured steering pinion angle is invalid in response to the difference between the estimated steering pinion angle and the measured steering pinion angle being greater than or equal to the threshold.

13. The method of claim 12, wherein the threshold is a variable threshold based on one or more vehicle parameters.

14. The method of claim 13, wherein the one or more vehicle parameters include a vehicle speed.

15. The method of claim 12, wherein:
  the at least one pinion angle sensor is a first pinion angle sensor;
  the road wheel system includes a second pinion angle sensor; and
  the method further comprises determining a validity of a steering pinion angle measured by the second pinion angle sensor based on the estimated steering pinion angle and the threshold.

16. The method of claim 15, wherein determining the validity of the measured steering pinion angle of the second pinion angle sensor includes:
  comparing a difference between the estimated steering pinion angle and the measured steering pinion angle of the second pinion angle sensor to the threshold; and
  determining the measured steering pinion angle is invalid in response to the difference between the estimated steering pinion angle and the measured steering pinion angle of the second pinion angle sensor being greater than or equal to the threshold.

17. The method of claim 16, wherein controlling the steering function of the vehicle based on the estimated steering pinion angle includes controlling the steering function of the vehicle based on the estimated steering pinion angle in response to determining that the measured steering pinion angle from the first pinion angle sensor and the measured steering pinion angle from the second pinion angle sensor are invalid.

18. The method of claim 11, wherein:
  the method further comprises estimating a steering pinion angle rate based on the generated model and determining a validity of an actual steering pinion angle rate based on the estimated steering pinion angle rate and a threshold; and
  controlling the steering function of the vehicle based on the estimated steering pinion angle includes controlling the steering function of the vehicle based on the estimated steering pinion angle in response to determining that the measured steering pinion angle and the measured steering pinion angle rate are invalid.

19. The method of claim 11, further comprising:
  receiving a motor position signal associated with the road wheel actuator; and
  estimating the rack force based on the received motor position signal.

20. A non-transitory computer-readable medium storing instructions that, when executed by a control module, cause the control module to:
  generate a model of a road wheel system in a vehicle based on a road wheel actuator command and a rack force, the road wheel system including a road wheel actuator having a rack and a pinion;
  estimate, with a state observer, a steering pinion angle based on the generated model, the road wheel actuator command and the rack force;
  determine a validity of a measured steering pinion angle from a pinion angle sensor in a vehicle based on the estimated steering pinion angle and a threshold; and
  in response to determining that the measured steering pinion angle is invalid, control a steering function of the vehicle based on the estimated steering pinion angle.

* * * * *